United States Patent
Gayosso Sanchez

(10) Patent No.: US 8,977,316 B2
(45) Date of Patent: Mar. 10, 2015

(54) MECHANISM TO BACKUP AND RESTORE THE CONFIGURATION OF A COMMUNICATION DEVICE USING A PORTABLE SECURITY DEVICE

(75) Inventor: Jose Luis Gayosso Sanchez, Meudon (FR)

(73) Assignee: Gemalto SA, Meudon (FR)

( * ) Notice: Subject to any disclaimer, the term of this patent is extended or adjusted under 35 U.S.C. 154(b) by 299 days.

(21) Appl. No.: 13/496,621

(22) PCT Filed: Sep. 15, 2010

(86) PCT No.: PCT/EP2010/063557
§ 371 (c)(1),
(2), (4) Date: Mar. 16, 2012

(87) PCT Pub. No.: WO2011/032989
PCT Pub. Date: Mar. 24, 2011

(65) Prior Publication Data
US 2012/0178422 A1   Jul. 12, 2012

(30) Foreign Application Priority Data
Sep. 16, 2009   (EP) .................................... 09305858

(51) Int. Cl.
*H04M 1/00* (2006.01)
*H04L 29/08* (2006.01)
*H04W 8/18* (2009.01)
*H04W 8/20* (2009.01)
*H04W 12/06* (2009.01)

(52) U.S. Cl.
CPC ............. *H04L 67/125* (2013.01); *H04W 8/183* (2013.01); *H04W 8/205* (2013.01); *H04W 12/06* (2013.01)
USPC ..................... 455/558; 455/575.1; 455/575.6; 455/90.1; 455/556.1

(58) Field of Classification Search
CPC . H04B 1/3816; H04M 2250/14; H04W 88/02
USPC .......................................................... 455/558
See application file for complete search history.

(56) References Cited

U.S. PATENT DOCUMENTS
2005/0020308 A1   1/2005   Lai

FOREIGN PATENT DOCUMENTS
WO   WO2005036916 A1      4/2005
WO   WO 2005053348 A2 *   6/2005
WO   WO2005053348 A2      6/2005

OTHER PUBLICATIONS
PCT/EP2010/063557 International Search Report, Dec. 13, 2010, European Patent Office, P.B. 5818 Patentlaan 2 NL—2280 HV Rijswijk.
PCT/EP2010/063557 Written Opinion of the International Searching Authority, Dec. 13, 2010, European Patent Office, P.B. 5818 Patentlaan 2 NL—2280 HV Rijswijk.

* cited by examiner

*Primary Examiner* — Charles Appiah
*Assistant Examiner* — Randy Peaches
(74) *Attorney, Agent, or Firm* — The Jansson Firm; Pehr B. Jansson

(57) ABSTRACT

The invention relates to a portable security device (SIM) for authenticating a user (USR) of a communication device (MP1, MP2) to a server (SRV), the portable security device (SIM) comprising means for configuring said communication device (MP1, MP2). The portable security device (SIM) further comprises means for filtering the configuration of a first communication device (MP1), creating a backup of the filtered configuration of the communication device (MP1), detecting that the user (USR) changed a first communication device (MP1) for a second communication device (MP2), filtering the backup of the filtered configuration, and restoring the filtered backup of the filtered configuration of the first communication device (MP1) on the second communication device (MP2). The invention also relates to systems comprising a portable security device (SIM) according to the invention, and to a method for a user (USR) to backup the configuration of a first communication device (MP1) and restore it on a second communication device (MP2), with a portable security device (SIM) according to the invention.

21 Claims, 1 Drawing Sheet

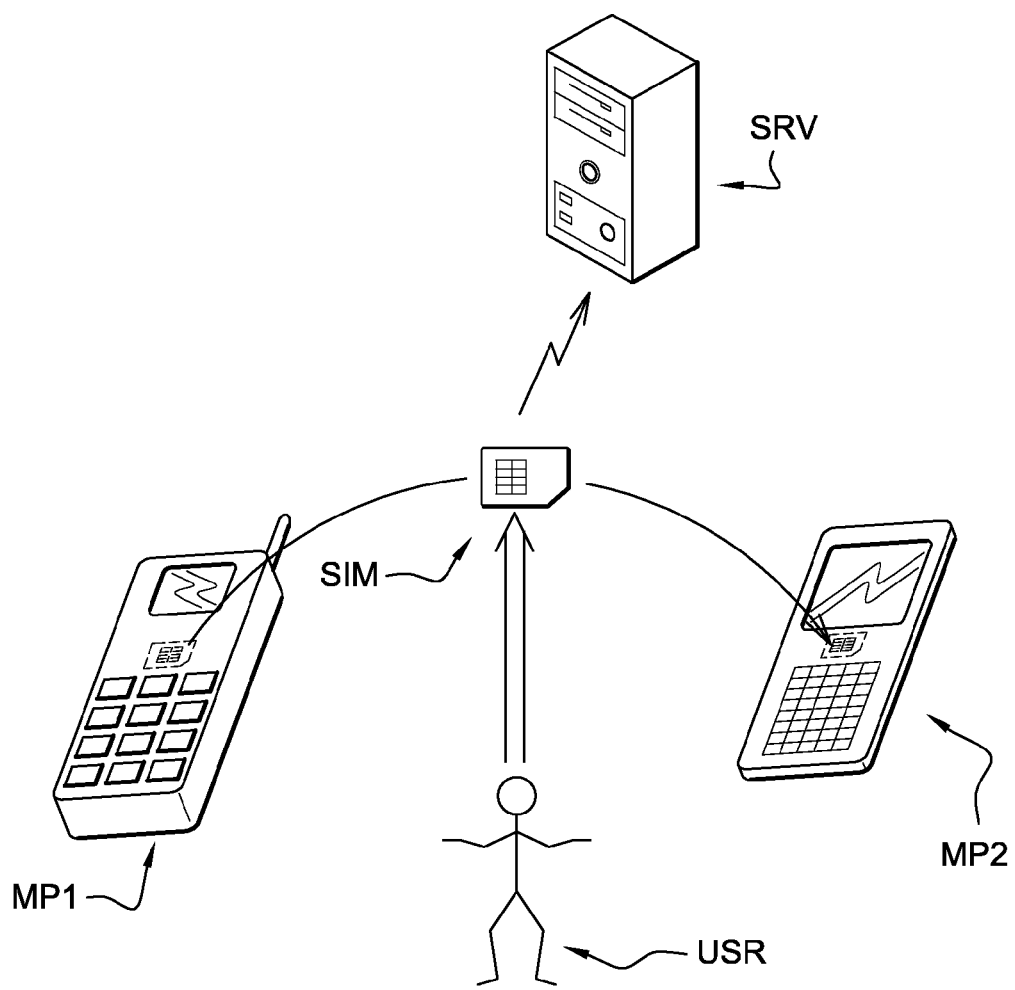

MECHANISM TO BACKUP AND RESTORE THE CONFIGURATION OF A COMMUNICATION DEVICE USING A PORTABLE SECURITY DEVICE

BACKGROUND

1. Field of the Invention

The invention relates to device management. It relates more specifically to portable security devices such as SIM cards used for configuring communication devices such as cell phones.

2. Description of the Related Art

A communication device is a device with communication capabilities. Examples of communication devices comprise a personal computer equipped with a networking equipment (e.g. WiFi card, Ethernet card, Wimax interface, etc.), a cellular phone, a PDA (personal digital assistant) with communication means (e.g. via Bluetooth, ZigBee, HiperLan 1 or 2, IrDa, USB, etc.), an M2M (machine to machine) device including a UICC, an ADSL box including a SIM, etc.

It is well known to use portable security devices such as smart cards for authenticating users of communication devices to servers. The most widespread example is certainly the SIM card, which is used in GSM mobile phones. GSM mobile network operators typically "rent" access to their network to users. However users are typically free to choose many communication devices (potentially including totally unsafe communication devices) for accessing the network. Therefore many mobile network operators have decided to provide their users with portable security devices (typically SIM cards), and only a communication device in which a proper SIM card has been inserted can connect to the network, which is a guarantee for the mobile network operator (reduced risks of credentials being stolen/copied). This is mandatory on GSM networks.

With the development of the telecommunications industry, communication devices have become more and more complex. For example mobile phones are no more simple phones limited to voice services, but can now connect to the Internet, take pictures and videos, record sounds, play music, provide GPS information, etc.

It has become more and more complex to configure communication devices. This is a problem for network operators who are unable to sell services to many users simply because the users, even when they have a recent communication device able to manage such service, often do not know how to configure the communication device. Typically configuring a mobile phone for Internet access requires typing the IP address of a proxy server, some port numbers, typing the address of a POP server for the email account, etc.

A new area of research and development has therefore emerged, which is called "device management". The applicant already manufactures portable security devices (in particular special SIM cards and special USB tokens) used to configure mobile phones and personal computers. The applicant also provides servers for device management (devices such as mobile phones can be configured by a server such as a GDM server through a network). In the context of mobile telephony, it has seemed useful to reuse the SIM card and assign it an additional task, namely the device management. SIM cards can therefore be used, when first connected into a mobile phone, to configure the mobile phone according to the policies of the mobile network operator. Some standardization bodies have even specified a number of ways to carry out device management. In particular OMA DM specifies how a server can configure a device, and is already implemented. OMA CP also specifies how a server can configure a device, but is not yet implemented to the best of the applicant's knowledge. On-going standardization initiatives (such as DM_SC) should in the future specify how portable security devices such as smart cards can assist in configuring a device.

Unfortunately the problem of device management is not yet fully solved. In particular, if a user has a communication device, and decides to change it for another communication device (e.g. a more recent model), the settings of the new communication device are either not initialized automatically, or initialized according to the operator's rules, and the user typically loses all his specific settings (e.g. what he configured himself, manually, possibly differently from what the operator had envisioned). For example, the default settings for an email account may be to use the email address provided by the network operator, while the user may have decided to use another email account as his main account. Therefore when changing his communication device (e.g. mobile phone) the user would have his email account configured, which is of course better than no email at all, but configured with the wrong account.

Some techniques have been proposed to backup and restore certain pieces of information such as the address book of a SIM card, however this does not concern the configuration of the communication device (e.g. mobile phone) but rather some personal data of the user which are stored on the portable security device.

It would be conceivable to use an OMA DM server in order to backup and restore the configuration of a first communication device into a second communication device. However, the radio resources would be impacted due to the number of data exchanges to be performed.

DETAILED DESCRIPTION

The invention and its advantages will be explained more in details in the following specification referring to FIG. 1, which represents a system comprising a first communication device MP1 (an old mobile phone) and a second communication device MP2 (a newer mobile phone). The system also comprises a server SRV, typically owned and managed by a mobile network operator operating a network to which the mobile phones MP1 and MP2 can connect. A user USR, who is a subscriber of the mobile network operator, is shown moving his SIM card SIM from his old mobile phone MP1 to his new mobile phone MP2.

A portable security device SIM according to the invention is set to authenticate a user USR of a communication device (such as a mobile phone MP1 or MP2, or a personal computer) to a server SRV. The portable security device can be a smart card, a USB token, a memory card (e.g. secure MMC card), a TPM (trusted platform module), an SD card (e.g. a secure SD card comprising a UICC), or any portable tamper-proof element. The portable security device has typically constrained resources (low CPU, low memory, etc.—as compared to a personal computer). It is typically powered by the communication device. In other words, it typically has no embedded source of energy (such as batteries or capacitors), although it is conceivable to add a source of energy, in particular for security reasons (e.g. for having a trusted time reference inside the portable security device). The portable security device is preferably connected to the communication device through electric contacts, for example a portable security device consisting of a SIM card is typically inserted inside a communication device consisting of a mobile phone, and connected to the mobile phone through contact means via an ISO 7816 or USB interface. However a portable security device according to the invention could also be connected to a communication device using other means, such as contactless smart card interfaces, Bluetooth, infrared, radio interfaces of any suitable type, etc.

The server SRV can be composed of a set of servers connected together (e.g. several software servers running on a single hardware, or even several hardware servers grouped together). Several hardware servers can be grouped together for redundancy (if one server fails, another server probably still works). Several hardware servers can also be grouped together for using a special server for each task. For example one task, managed by a first server, can consist in authenticating portable security devices (it may require specific hardware security features), while another task, managed by a second server, might consist in configuring communication devices. Several hardware servers can also be grouped together for both above reason, or for any other reason. Different servers can be grouped together even if they are not located in the same place (they can be physically distant but connected together through a network for example).

The portable security device SIM is typically provided by a network operator who also operates the server SRV. Such network operator can be for example a mobile network operator offering access to mobile networks such as GSM, GPRS, UMTS, LTE, WiMax (for which a WiMaxSIM was defined), or CDMA2000 networks. It can also be a "fixed network" operator providing access to networks such as the Internet through technologies such as analog modems on POTS, or ADSL, or cable, or FTTH (optical fibers "to the home"). The network operator can also provide access through other technologies (e.g. IP telephony through WiFi access points, satellites, etc.).

The portable security device SIM comprises means to configure said communication device (e.g. MP1, MP2). This may allow, for example, a 3G network operator to activate Internet access on a cellular phone of a new subscriber by properly configuring the cell phone of this subscriber (user of the network) for the 3G network at stake. Such configuration can for example comprise defining the IP address of a proxy server/default gateway, the IP address of a DNS server, some DHCP settings, a subnet mask, an email server address (e.g. POP server or IMAP server), etc. A "fixed" network operator can also use such portable security device, e.g. send a USB token to each new subscriber in order to automatically configure the subscriber's personal computer while also securing the connection of the subscriber with the same USB token. Configuring the communication device can also comprise configuring services other than Internet and email access, e.g. providing GPS parameters in order to enable GPS localization, configuring calendar synchronization, providing parameters for automatic backup of personal data (e.g. backup server address, backup frequency, such as backup every day at 3 AM, archival of previous backup such as: keep one week of backup), etc.

According to the invention, the portable security device SIM further comprises means for:

a. filtering the configuration of a first communication device MP1. For example, a SIM card may retrieve the configuration of a mobile phone in which it has been inserted by using the OMA DM protocol. The SIM card may then analyze the configuration, and alter the configuration according to certain criteria. The configuration is not necessarily altered in the memory of the mobile phone, it may simply (and preferably) be altered only in the memory of the SIM card.

b. creating a backup of the filtered configuration of the communication device MP1. The backup is preferably kept in a non volatile memory (e.g. flash, EEPROM, or battery protected RAM) of the portable security device. The portable security device can keep an image of what the configuration of the first communication device should be (as opposed to what the configuration really is, before filtering).

c. detecting that the user USR changed a first communication device MP1 for a second communication device MP2. For example, when a SIM card is inserted in a cell phone, the SIM can identify the cell phone, record the identification, and compare it with a previously stored identification. If there's a mismatch, the SIM card can infer that either the SIM card is inserted for the first time in a cell phone, or the SIM card has been transferred from a first cell phone to a second cell phone. The same would be true for example with a USB token when the USB token is moved from a first laptop computer to a second laptop computer. It is therefore possible for a portable security device according to the invention to detect that the user has decided to use his network subscription with a different communication device.

d. filtering the backup of the filtered configuration. The filtering of the backup preferably takes into account some specificities of the second communication device. Such specificities are typically not known at the time the backup of the filtered configuration is carried out (since it is in general impossible to predict that the user is going to change communication device and which communication device he's going to use next). This is one of the reasons why a two stage filtering is proposed.

e. restoring the filtered backup of the filtered configuration of the first communication device MP1 on the second communication device MP2. Consequently, all services which were available on the first communication device are normally automatically configured on the second communication device, and according to the preferences of the user.

According to a preferred embodiment, the means for filtering the configuration of a first communication device MP1 comprise means for checking compliance of an element of the configuration of the first communication device MP1 with a policy. The policy can be for example a policy of the network operator. The policy may for example specify a set of authorized DNS servers, or a set of authorized email servers. The network operator may for example impose the use of an email address that he provides, as opposed to a third party's email address. If the user changes the configuration of his cell phone, the filtering can check whether or not the change is authorized by the network operator. One area in which the policies can be particularly useful is security. Indeed many users are not so conscious of security issues and do not care about taking preventive measures. Most users only care about security issues once they have a problem (virus infection etc.). Therefore some users may for example deactivate antiviruses or other security tools, or set parameters such that their communication device operates quicker, but the increased performance has a cost (reduced security). The policy may enforce a safer configuration.

According to a preferred embodiment, means for filtering the configuration of the first communication device MP1 are set to leave unchanged an element of the configuration which is compliant with the policy, and a. to remove non compliant elements. For example if the user has configured a free telephony over IP application, the portable security device can comprise means to deactivate such application if this application is contrary to the policy of the network operator. This may be the case for example if the operator provides unlimited Internet access but charges for voice communications. Or b. to replace non compliant elements by default elements. For example, the email address of the user may be replaced by the email address provided to the user by the operator. Or c. to reformat non compliant elements according to the policy. For example if the user has specified in his email configuration that his email account should be checked every 5 seconds, this may be contrary to the policy of the operator. The network operator may indeed consider that checking email once per minute is sufficient and that for avoiding overloads of requests on the email server, the check frequency has to be lower than or equal to once per minute. The reformatting option is mostly applicable to composite elements comprising several sub-features, where certain sub-features of the element are compliant with the policy while others are not.

According to a preferred embodiment of the invention, means for filtering the configuration of the first communication device MP1 are set to leave unchanged an element of the configuration which is compliant with the policy, to report non compliant elements to the server SRV. Means for filtering the configuration of the first communication device MP1 may then manage non compliant elements according to instructions optionally received from the server SRV. For example, the operator may decide to treat non compliance to the policy differently according to the profile of the user. The server SRV may for example store information regarding the type of subscription of the user, and how heavily the user consumes services proposed by the operator. If the user is an excellent customer and uses heavily certain services, certain non compliances which result from voluntary modifications by the user may be justified and tolerated by the operator. Reliance on the server SRV can also be useful in order to obtain the most recent parameters for certain services. For example, certain antivirus or firewall parameters may evolve as new threats or attacks are discovered, and the server SRV may therefore enforce updated policies which were not known at the time the portable security device was delivered to the user USR.

According to a preferred embodiment, means for filtering the backup of the filtered configuration comprise means for obtaining a device description of the second communication device MP2 and for formatting the backup of the filtered configuration according to said device description. In OMA DM, each communication device (e.g. handset etc.) has a specific "device description" that is typically communicated to network operators by handset vendors. This description is typically different for each communication device, therefore when a user changes a communication device, raw back up of configuration data is in general not enough to guarantee the feasibility of the restore operation on the new communication device. A kind of translation is needed. The portable security device may report the "device identity" of the communication device to the server SRV (there are known solutions for that, for example the IMEI tracking solution for mobile phones). The server SRV may for example return an SMS (short message) containing the device description to the portable security device, when the portable security device is a SIM card.

According to a preferred embodiment, means for restoring the filtered backup of the filtered configuration of the first communication device MP1 on the second communication device MP2 comprise means to establish a DM session with the second communication device MP2, a. after the second communication device MP2 bootstraps directly from the portable security device SIM, or b. after the server SRV remotely bootstraps the second communication device MP2 (the applicant sells a solution called GemConnectDM which can perform this type of remote bootstrap), or c. after the portable security device SIM sends a bootstrap message to the second communication device MP2.

The invention also relates to a system comprising a portable security device such as the SIM described above and a communication device such as the above described mobile phones MP1 and MP2.

The invention also relates to a system comprising a portable security device SIM and the server SRV. This system may also comprise the communication devices.

The invention also relates to a method for a user USR to backup the configuration of a first communication device MP1 and restore it on a second communication device MP2. The method comprises using a portable security device SIM designed for authenticating the user of the communication devices (such as a mobile phone MP1 or MP2) to a server SRV and for configuring communication devices. The method further comprises the steps of a. filtering by the portable security device SIM the configuration of the first communication device MP1, b. creating in the portable security device SIM a backup of the filtered configuration of the communication device MP1, c. detecting by the portable security device SIM that the user USR changed the first communication device MP1 for the second communication device MP2, d. filtering by the portable security device SIM the backup of the filtered configuration, e. restoring by the portable security device SIM the filtered backup of the filtered configuration of the first communication device MP1 on the second communication device MP2.

In the above described embodiments, the OMA DM protocol may be implemented for example over the Bearer Independent Protocol or over TCP/IP. The device management means embedded in the portable security device can be implemented in a web server such as a smart card web server (such as SCWS, which is based on http).

The invention is advantageous in particular because it minimizes radio resources usage for device management. Radio resources are preferably dedicated primarily to the services sold to subscribers, and it is advantageous to reduce to the minimum the bandwidth wasted on "administrative" traffic such as device management.

The invention is also advantageous in that it also works on communication devices which are not subsidized by network operators, as long as the communication device implements the required device management functions.

The preferred embodiments and variants described above in relation to any one of the three following objects/methods: {portable security device, systems, method for configuring a communication device} can apply equally to the other two objects/methods.

The invention claimed is:

1. A portable security device (SIM) for authenticating a user (USR) of a communication device (MP1, MP2) to a server (SRV), the portable security device (SIM) configured to communicate with the communication device (MP1,MP2) when connected to the communication device (MP1,MP2) and comprising means for configuring said communication device (MP1, MP2), the portable security device (SIM) comprising means for a. filtering the configuration of a first communication device (MP1), b. creating a backup of the filtered configuration of the first communication device (MP1) and storing the backup of the filtered configuration in a memory within the portable security device (SIM),
c. detecting that the user (USR) changed a first communication device (MP1) for a second communication device (MP2) by the portable security device (SIM) detecting a connection between the portable security device (SIM) and the second communication device (MP2),
d. filtering the backup of the filtered configuration by retrieving the stored backup of the filtered configuration from the memory within the portable security device (SIM),
e. restoring the filtered backup of the filtered configuration of the first communication device (MP1) on the second communication device (MP2).

2. The portable security device (SIM) according to claim 1, wherein the means for filtering the configuration of a first communication device (MP1) comprises means for checking compliance of an element of the configuration of the first communication device (MP1) with a policy.

3. The portable security device (SIM) according to claim 2, wherein the means for filtering the configuration of the first communication device (MP1) are set to leave unchanged an element of the configuration which is compliant with the policy, and
 a. to remove noncompliant elements, or
 b. to replace noncompliant elements by default elements, or
 c. to reformat noncompliant elements according to the policy.

4. The portable security device (SIM) according to claim 2, wherein the means for filtering the configuration of the first communication device (MP1) are set to leave unchanged an element of the configuration which is compliant with the policy, and to report noncompliant elements to the server (SRV).

5. The portable security device (SIM) according to claim 4, wherein the means for filtering the configuration of the first communication device (MP1) are set to manage noncompliant elements according to instructions received from the server (SRV).

6. The portable security device (SIM) according to any previous claim, wherein the means for filtering the backup of the filtered configuration comprise means for obtaining a device description of the second communication device (MP2) and for formatting the backup of the filtered configuration according to said device description.

7. The portable security device (SIM) according to any of claims 1 through 5, wherein the means for restoring the filtered backup of the filtered configuration of the first communication device (MP1) on the second communication device (MP2) comprise means for establishing a DM session with the second communication device (MP2)
 a. after the second communication device (MP2) bootstraps from the portable security device (SIM), or
 b. after the server (SRV) remotely bootstraps the second communication device (MP2), or
 c. after the portable security device (SIM) sends a bootstrap message to the second communication device (MP2).

8. A method for a user (USR) to backup the configuration of a first communication device (MP1) and restore the configuration on a second communication device (MP2), the method comprising using a portable security device (SIM) designed for authenticating the user of the communication devices (MP1, MP2) to a server (SRV) and configured to connect to the communication devices (MP1, MP2) and for configuring communication devices (MP1, MP2), the method further comprising:

a. filtering by the portable security device (SIM) the configuration of the first communication device (MP1),
b. creating in the portable security device (SIM) a backup of the filtered configuration of the communication device (MP1) and storing the backup of the filtered configuration in a memory on the portable security device (SIM),
c. detecting by the portable security device (SIM) that the user (USR) changed the first communication device (MP1) for the second communication device (MP2) by the portable security device detecting a connection to the second communication device (MP2);
d. filtering by the portable security device (SIM) the backup of the filtered configuration by retrieving the stored backup of the filtered configuration from the memory on the portable security device (MP2),
e. restoring by the portable security device (SIM) the filtered backup of the filtered configuration of the first communication device (MP1) on the second communication device (MP2).

9. The method of claim 8 wherein the step of filtering the configuration of the first communication device (MP1) comprises:
 checking compliance of an element of the configuration of the first communication device (MP1) with a policy.

10. The method of claim 9 wherein the step of filtering the configuration of the first communication device (MP1) comprises:
 leaving unchanged an element of the configuration which is compliant with the policy, and
 a. removing noncompliant elements, or
 b. replacing noncompliant elements by default elements, or
 c. reformatting noncompliant elements according to the policy.

11. The method of claim 9 wherein the step of filtering the configuration of the first communication device (MP1) comprises leaving unchanged an element of the configuration which is compliant with the policy, and to report noncompliant elements to the server (SRV).

12. The method of claim 11 wherein the step of filtering the configuration of the first communication device (MP1) comprises managing noncompliant elements according to instructions received from the server (SRV).

13. The method of claim 8 wherein the step of filtering the backup of the filtered configuration comprises obtaining a device description of the second communication device (MP2) and for formatting the backup of the filtered configuration according to said device description.

14. The method of claim 8 wherein the step of restoring the filtered backup of the filtered configuration of the first communication device (MP1) comprises establishing a DM session with the second communication device (MP2)
 a. after the second communication device (MP2) bootstraps from the portable security device (SIM), or
 b. after the server (SRV) remotely bootstraps the second communication device (MP2), or
 c. after the portable security device (SIM) sends a bootstrap message to the second communication device (MP2).

15. A portable security device (SIM) for authenticating a user (USR) of a communication device (MP1, MP2) to a server (SRV), the portable security device (SIM) configured to connect with a communication device (MP1, MP2) and operable to configure said communication device (MP1, MP2), the portable security device (SIM) comprising instructions executable by the portable security device and which cause the portable security device (SIM) to:

a. filter the configuration of a first communication device (MP1),
b. create a backup of the filtered configuration of the communication device (MP1) and store the backup of the filtered configuration in a memory within the portable security device (SIM),
c. detect that the user (USR) changed a first communication device (MP1) for a second communication device (MP2) by the portable security device (SIM) detecting a connection to the second communication device (MP2),
d. filter the backup of the filtered configuration by retrieving the stored filtered configuration from the memory within the portable security device (SIM),
e. restore the filtered backup of the filtered configuration of the first communication device (MP1) on the second communication device (MP2).

16. The portable security device (SIM) according to claim 15, wherein the instructions to filter the configuration of a first communication device (MP1) comprises instructions to cause the portable security device (SIM) to check compliance of an element of the configuration of the first communication device (MP1) with a policy.

17. The portable security device (SIM) according to claim 16, wherein the instructions to filter the configuration of a first communication device (MP1) comprises instructions to leave unchanged an element of the configuration which is compliant with the policy, and
  a. to remove noncompliant elements, or
  b. to replace noncompliant elements by default elements, or
  c. to reformat noncompliant elements according to the policy.

18. The portable security device (SIM) according to claim 16, wherein the instructions to filter the configuration of a first communication device (MP1) comprises instructions to leave unchanged an element of the configuration which is compliant with the policy, and to report noncompliant elements to the server (SRV).

19. The portable security device (SIM) according to claim 18, wherein the instructions to filter the configuration of a first communication device (MP1) comprises instructions to manage noncompliant elements according to instructions received from the server (SRV).

20. The portable security device (SIM) according to claim 15, wherein the instructions to filter the backup of the filtered configuration comprises instructions to cause the portable security device to obtain a device description of the second communication device (MP2) and to format the backup of the filtered configuration according to said device description.

21. The portable security device (SIM) according to claim 15, wherein the instructions to restore the filtered backup of the filtered configuration of the first communication device (MP1) on the second communication device (MP2) comprise instructions to cause the portable security device to establish a DM session with the second communication device (MP2)
  a. after the second communication device (MP2) bootstraps from the portable security device (SIM), or
  b. after the server (SRV) remotely bootstraps the second communication device (MP2), or
  c. after the portable security device (SIM) sends a bootstrap message to the second communication device (MP2).

* * * * *